UNITED STATES PATENT OFFICE.

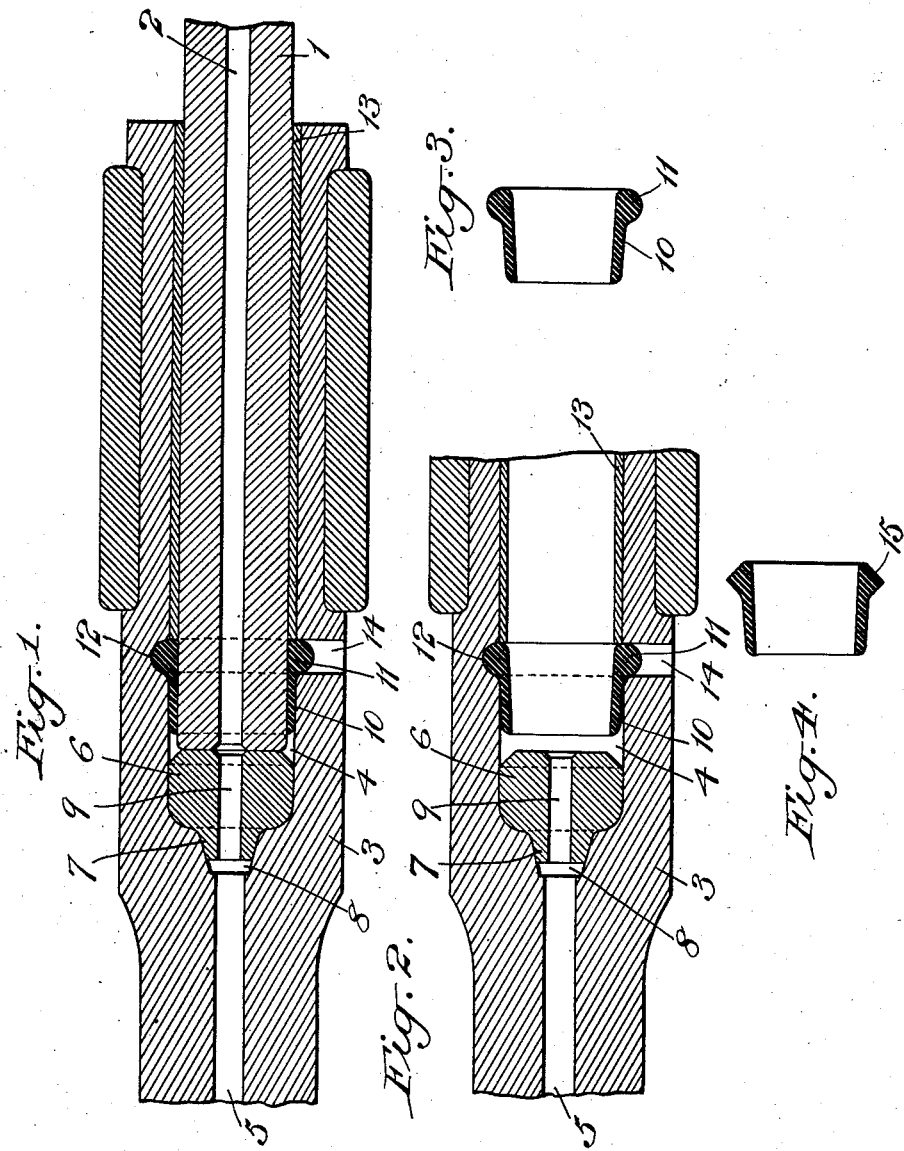

CHARLES C. HANSEN, OF EASTON, PENNSYLVANIA, ASSIGNOR TO INGERSOLL-RAND COMPANY, OF NEW YORK, N. Y., A CORPORATION OF NEW JERSEY.

DRILL-STEEL CHUCK FOR STONEWORKING-MACHINES.

1,009,303.　　　　Specification of Letters Patent.　　Patented Nov. 21, 1911.

Original application filed January 20, 1909, Serial No. 473,359. Divided and this application filed June 2, 1911. Serial No. 630,827.

*To all whom it may concern:*

Be it known that I, CHARLES C. HANSEN, a citizen of the United States, and resident of Easton, in the county of Northampton and State of Pennsylvania, have invented a new and useful Improvement in Drill-Steel Chucks for Stoneworking - Machines, of which the following is a specification.

My invention consists in certain improvements in the construction, form and arrangement of the several parts of a drill steel chuck whereby a fluid-tight packing may be provided for the hollow drill steel and means may be provided for facilitating the removal of the packing from the chuck.

In the accompanying drawings, Figure 1 represents in longitudinal central section so much of a drill steel and its chuck as will give a clear understanding of this invention, Fig. 2 is a similar view with the drill steel removed, Fig. 3 is a longitudinal central section through the elastic washer which forms the fluid-tight packing for the drill steel, and Fig. 4 is a similar view through an elastic washer having a modified form of circumferential bead.

The drill steel is denoted by 1 and its longitudinally arranged axial bore is denoted by 2. The drill steel receiving chuck is denoted by 3 and its socket is denoted by 4. A longitudinally arranged axial bore 5 leads rearwardly from the bottom of the socket 4. A hollow thrust block 6 is removably seated in the bottom of the drill steel receiving socket 4, which thrust block is provided with a tapered centrally arranged lug 7 arranged to enter a centrally arranged flaring seat 8 at the bottom of the socket 4, so as to center the bore 9 through the block 6 with respect to the bores 2 and 5 in the drill steel and chuck respectively. This thrust block 6 is preferably made of wear resisting material and eliminates the wearing away of the bottom of the socket 4 in the chuck, as has heretofore been common due to its engagement with the inner end of the drill steel. When one of these thrust blocks has become worn, it may be readily replaced by another.

A fluid-tight packing for the hollow drill steel is provided in the socket 4 of the chuck, which packing comprises an elastic washer 10 having a circumferential bead 11 adapted to fit into an annular recess 12 in the socket 4 at a short distance in front of the removable thrust block 6. A hollow bushing 13 extends from the outer end of the elastic washer 10 to the outer end of the chuck. This elastic washer 10 has a circumferentially contracted bore so that when the drill steel is inserted into position within the socket in the chuck, the walls of the washer will be forced outwardly so as to form a fluid tight packing between the drill steel and the walls of the socket 4. In the present instance, this contracted bore is formed by tapering the bore from end to end of the washer and the circumferential bead is located at the enlarged end of the bore.

The chuck is provided with a transverse hole 14 leading to the elastic washer 10 for permitting the removal of the gasket when it becomes worn out. This removal may be accomplished by inserting a pin or other device into the hole 14 and pushing the washer inwardly until it may be withdrawn through the socket 4 by a hook inserted into the socket from the front end thereof. In Figs. 1, 2 and 3, I have shown the elastic washer as provided with a circumferential bead half round in cross section while in Fig. 4, this circumferential bead is shown as angular in cross section, as shown at 15. It is to be understood that this bead and its corresponding recess in the socket of the chuck may be made of any desired form which will hold the washer in position within the socket.

The thrust block shown and described but not claimed herein, forms the subject-matter of my application filed January 20, 1909, Serial No. 473,359, of which the present application is a division.

What I claim is:

1. In combination, a chuck having a drill steel receiving socket therein and an elastic washer, said washer having a normally contracted bore for forming a fluid-tight packing for the drill steel.

2. In combination, a chuck having a drill steel receiving socket therein provided with an annular recess, and an elastic washer having a circumferential bead located in said annular recess, said washer having a normally contracted bore for forming a fluid-tight packing for the hollow drill steel.

3. A fluid-tight packing for drill steels comprising an elastic washer having a normally contracted bore.

4. A fluid-tight packing for drill steels comprising an elastic washer having a normally contracted bore and a circumferential bead.

5. A fluid-tight packing for drill steels comprising an elastic washer having its bore tapered and provided with a circumferential bead at the enlarged end of the bore.

6. In combination, a chuck having a drill receiving socket therein provided with an annular recess, an elastic washer having a circumferential bead located in said recess, the said chuck having a transverse hole leading to the washer for facilitating its removal from the chuck.

In testimony that I claim the foregoing as my invention, I have signed my name in presence of two witnesses, this twenty-ninth day of May, 1911.

CHARLES C. HANSEN.

Witnesses:
F. GEORGE BARRY,
HENRY C. THIEME.